May 7, 1957 J. E. MOISE ET AL 2,791,618
PROCESS FOR PREPARING ALKALI-METAL CATALYZED POLYMERS
Filed Feb. 10, 1955
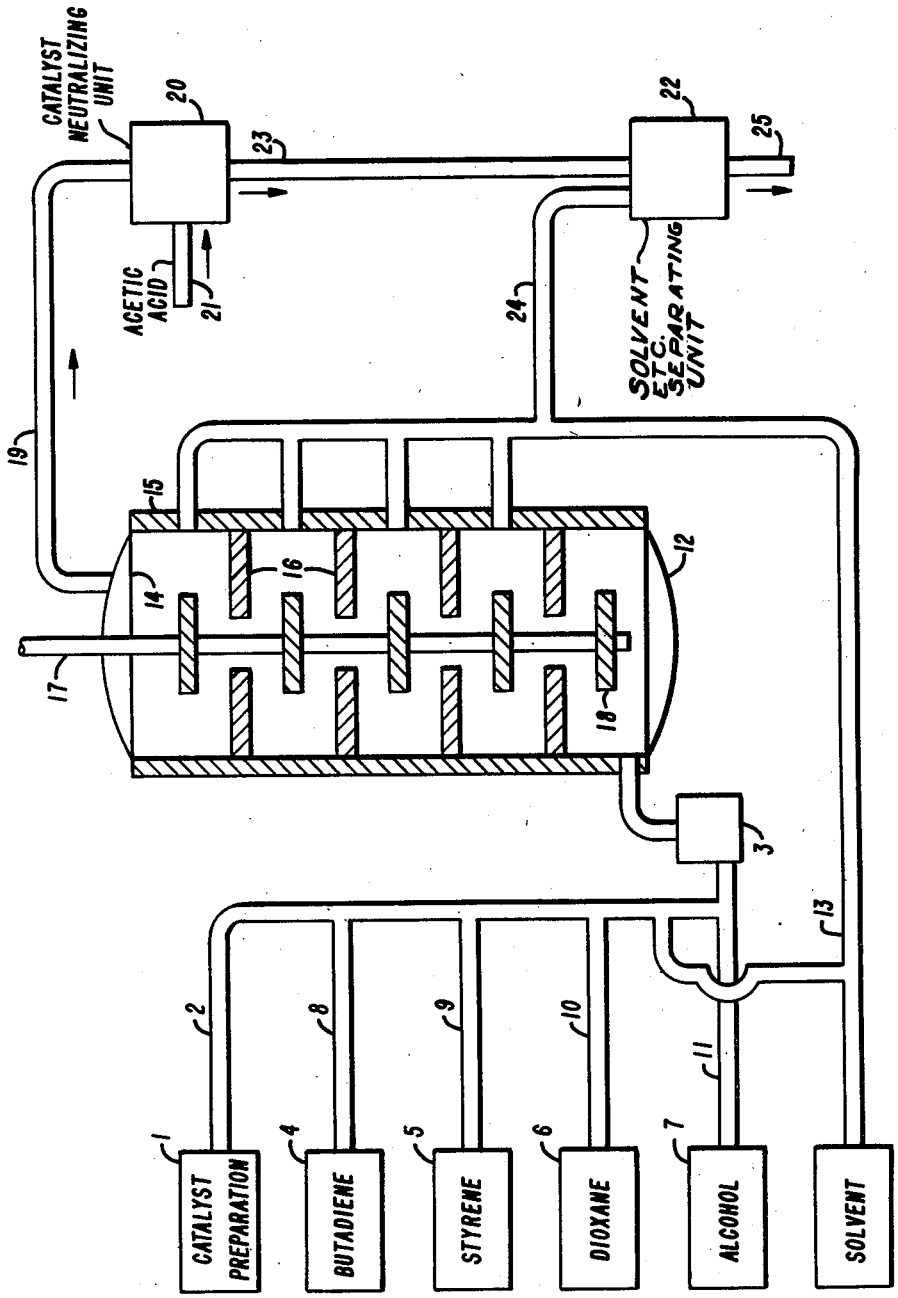
James E. Moise
Marnell A. Segura   Inventors
By  Attorney United States Patent Office 2,791,618
Patented May 7, 1957

2,791,618

PROCESS FOR PREPARING ALKALI-METAL CATALYZED POLYMERS

James Edward Moise and Marnell Albin Segura, Baton Rouge, La., assignors to Esso Research and Engineering Company, a corporation of Delaware Application February 10, 1955, Serial No. 487,404

4 Claims. (Cl. 260—669)

This invention relates to a process for the production of polymers of 1,3-butadiene. In one preferred embodiment, the invention relates to the use of a series of steps at particular conditions adapted to produce a finished liquid product of relatively high viscosity and low color. A more specific embodiment relates to the preparation of a copolymer of 1,3-butadiene and a vinyl aromatic, such as styrene, utilizing process steps resulting in the formation of a relatively high molecular weight liquid copolymer of controlled viscosity.

The polymerization of conjugated diolefins, such as 1,3-butadiene with or without comonomers, such as vinyl aromatics, including styrene, in the presence of alkali metal catalysts in the presence or absence of solvents is well known. Solid or liquid polymers may be produced using these catalysts. Liquid polymers are readily formed by operating at relatively high temperatures or with relatively large amounts of catalyst and in the presence of a solvent such as naphtha, Varsol, heptane or the like to obtain a solution of a liquid polymer in the solvent.

While the above process operates well in laboratory tests, the conversion of the process to a continuous one involves difficulties not encountered in the batch process. It has previously been proposed in copending application Serial No. 420,498, filed April 2, 1954, in the names of Stanley E. Jaros and Anthony H. Gleason, to carry out the continuous conversion in a plurality of stages employing temperature differentials between the stages and effecting a high but partial conversion in the first and immediately succeeding stages and reaching 100% conversion only in the last stage. Excellent results can be obtained by the operation of such a process but the viscosity of the product is very low, being of the order of about 0.2 to 0.6 at 50% N. V. M. If higher viscosities are desired the product can be heat-bodied at temperatures between 200 and 260° C. in accordance with the teachings of U. S. Patent 2,672,425, issued March 16, 1954, to Anthony H. Gleason and Robert F. Leary. The heat bodying is generally continued until a product is obtained which has a poise viscosity of about 3.5 to 7.5 or higher at 50% N. V. M. Such a bodied product has better drying properties than an oil synthesized to the same viscosity. However, it has been found by experience that the low viscosity polymers obtained in the continuous process as above described do not yield a product having as good a drying rate after heat bodying as an oil which has been synthesized to an original poise viscosity of about 1.0 to 2.5 at 50% N. V. M. and then bodied to a viscosity of 3.5 to 7.5 poises as described above. While in batch operations the viscosity of the oil can be controlled by appropriate changes in synthesis temperature, it has proved difficult to obtain oils having the desired higher viscosities prior to bodying when continuous multistage operations are employed.

It is therefore the major object of this invention to synthesize liquid polymers of butadiene having viscosities within the range of 1.0 to 2.5 poises at 50% N. V. M. in a continuous process.

Another object is to provide improvements in the multistage continuous sodium-catalyzed copolymerization of 1,3-butadiene and styrene.

A further object is to provide a liquid copolymer of butadiene and styrene of improved characteristics as a drying oil.

Other objects and advantages of the invention will be apparent to one skilled in the art from the accompanying description.

These and other objects of this invention are accomplished by carefully controlling the conditions used in the first stage of the process. The temperature should be maintained between 50 and 60° C. although it may go as high as 70° C. Of more importance, however, is the equilibrium monomer concentration in the first stage. This should be as high as conveniently possible. High concentrations can be obtained by employing low conversions and/or as little diluent as possible. The amount of catalyst should be low, not over 2.0%, based on monomers, preferably between 1.0 and 1.5%. It is also desirable to maintain a rather low holding time in the first stage, i. e., the reactants should remain in the first stage for as short a time as possible. Of the above factors the use of high concentrations of monomers in the first stage is the most important. While the only diluents necessarily present in the first stage are those introduced with the catalyst dispersion, the ether modifier and the alcohol catalyst activator, additional diluent should be present to enable the viscosity of the product to be within a workable range. A practical range of workable equilibrium monomer concentrations lies between 40 and 60% on a diluent-free basis. This can be suitably accomplished by increasing the ratio of monomers to diluent in the feed and by lowering the conversion. The monomers, e. g. butadiene and styrene, at the onset of the reaction are miscible with each other and with the ether and alcohol and the small amounts of solvent introduced with the catalyst. This is sufficient to insure contact of the reactants and to dissolve the initial polymer formed. In later stages of the process as the amount of polymer builds up and the viscosity of the system increases, more solvent can be added if desired. The total quantities of solvent added may be in quantities within the range of 300 to 500 parts of solvent per 100 parts of monomers. A suitable solvent is a hydrocarbon liquid boiling between 20 and 250° C. In this way the monomer concentrations in the early stages of the process are maintained high and the polymerization reaction proceeds at a more nearly uniform rate due to the effective dispersion of the reactants and catalyst. It is preferable to maintain the first stage between 40 and 60%, preferably about 50%.

In a specific embodiment of this invention, a plurality of vessels are used as reactors. Each vessel is equipped with an agitator and inlets for the introduction of reactants, solvent and catalyst. The initial charge is introduced to the first vessel in the series and the product is withdrawn from the last. In the initial vessel the catalyst, monomers, modifier, catalyst activator and the small amount of solvent necessary to disperse the catalyst are introduced. Additional, larger amounts of solvent may be introduced into the second and/or succeeding vessels in the series.

The polymer solution withdrawn from the final stage is fed to a polymer separation system where the solvent, modifiers, etc. are removed and recycled to the reactor.

In order to illustrate a specific embodiment of the process of this invention, reference is had to the accompanying drawing. In the description reference is had to specific comonomers and also to a specific design and arrangement of equipment. It is to be understood, of course, that variations in both materials and equipment may be made without departing from the scope of the disclosure.

A finely divided suspension of alkali metal catalyst, for example sodium in Varsol, from catalyst preparation vessel 1, is introduced by line 2 into mixer 3. Simultaneously butadiene from tank 4, styrene from tank 5, dioxane from tank 6, and alcohol from tank 7 are passed by lines 8, 9, 10 and 11, respectively, into mixer 3 and introduced into the lowermost stage or reactor 12. Varsol solvent from line 13 is introduced to each of the second and succeeding stages of the reactor as needed.

The reactor itself consists of a large vessel 14 surrounded by cooling jacket 15 and divided into five stages by means of horizontal baffles 16. A vertical shaft 17 bearing blades 18 is disposed centrally of vessel 14 as an agitator. Polymerization occurs in reactor 12 and the viscous polymer solution passes from stage to stage by overflowing between the baffles 16. The polymer solution passes from the reactor by line 19 to a sodium neutralizing or removal section 20. This may be accomplished by the addition through line 21 of glacial acetic acid in slight excess of that necessary to combine with the sodium. The excess acetic acid is neutralized with ammonia. The neutralized mixture is filtered in a conventional rotary filter to remove the sodium and ammonium acetate salts. The filtered polymer solution is then fed to a separating unit 22 by line 23 where Varsol solvent, ether and alcohol are stripped off and recycled to the reactor through line 24. Liquid polymer is removed through line 25 and is ready for further processing.

In the manner described 50 to 100 parts of a conjugated diolefin, such as butadiene, and 50 to 0 parts of styrene may be polymerized in a multistage once-through continuous process in the presence of a finely divided alkali metal, such as sodium, potassium, lithium, caesium or rubidium.

The diluents suitable for use in this invention are essentially aliphatic hydrocarbons such as naphtha (boiling range 90 to 120° C.) or straight-run mineral spirits such as Varsol (boiling range about 150 to 200° C.) but butane, pentane, benzene, toluene, xylene, cyclohexane, butenes, pentenes or similar inert hydrocarbons are also usable alone or in admixture. It is also desirable to include a substantial amount of certain ethers as codiluents or reaction modifiers. Suitable ethers include aliphatic ethers such as diethyl ether, vinyl isobutyl ether, and cyclic ethers such as dioxane-1,4 and other cyclic ethers having the oxygen atoms separated by at least two carbon atoms. All cyclic ethers having an O—C—O group in a ring structure such as dioxane-1,3, dioxolane, paraldehyde, and glycol ethylidene diacetal inhibit the polymerization. The ethers are used in amounts ranging from about 1 to 100 parts, preferably 5 to 50 parts, by wt. per 100 parts of monomers.

It is also advantageous to use about 10 to 50%, preferably 10 to 30 wt. percent (based on sodium) of an alcohol in the recipe. Suitable alcohols include ethanol, isopropanol, isobutanol, isopentanol, secondary butanol and tertiary butanol.

The reaction time and induction period vary depending on the degree of catalyst dispersion, reaction temperature, and purity of feed materials. The residence time for the first stage should range between 0.5 to 2 hours while for the subsequent stages it may range up to 6 hours. The catalyst particle size should be about 1 to 50, preferably 20–40, microns. It is usually fed to the reactor as a slurry in 2 to 200 parts by weight of a hydrocarbon diluent, which may or may not be the same as the reaction diluent.

It is preferable to initiate the process by first charging the first stage of the reactor with the reactants, catalyst, and modifiers, and only enough diluent to give a workable solution and batch reacting the charge until the reaction has reached a conversion level of about 40%. The continuous addition of reactant, solvent, modifiers and catalyst are then begun and the reaction continued only for a short time, i. e. until conversion has built up to about 45–50%. The contents of the first stage are then allowed to flow continuously to the second stage where additional portions of the diluent are added. Additional styrene, modifier and catalyst may be added if desired. The reaction continues in this stage and flows continuously to as many stages as desired. The greater the number of stages used, the nearer the operation approaches that of a batch process. Additional diluent may be added in each succeeding stage.

The product of the invention is a solution of polymer in a hydrocarbon diluent and is, depending on the amount and type of ether used and the amount of diluent used at the various stages of the process, a clear, colorless to light yellow oil which has a viscosity of 1.0 to 2.0 poises at 50% N. V. M., preferably 1.5 to 3.0 poises.

The following example is offered to illustrate certain features of the invention, and it will be understood that all of the specific conditions and limitations given are not necessarily coexistent with the broad scope of the invention as defined in the claims.

*Example*

A series of runs were made in a semi-commercial 5-stage unit to show the effect of monomer concentration in the first stage on the viscosity of the liquid product. In each experiment a mixture of 80% butadiene and 20% styrene was introduced into the first stage together with 30 parts of dioxane, 0.3 part of isopropyl alcohol, all based on monomers, and Varsol diluent and catalyst as indicated below. Monomer equilibrium concentration in the first stage was varied by varying the conversion and amount of diluent added with the feed. The following data were obtained:

| Run | A | B | C | D |
|---|---|---|---|---|
| Monomers: | | | | |
| Percent Feed | 29 | 45 | 45 | 45 |
| Percent 1st Stage | 2.9 | 11.2 | 19 | 25.2 |
| Feed Rate, G. P. H. | 50 | 60 | 52 | 55 |
| Na Conc. (Percent Monomers) | 3 | 1.0 | 1.5 | 1.8 |
| T., ° C., 1st Stage | 55 | 71 | 50 | 52 |
| Conversion, Percent, 1st Stage | 90 | 75 | 58 | 44 |
| Prod. Visc., Poise @ 50% N. V. M. | 0.4 | 0.7 | 1.2 | 1.8 |

The above data clearly show that by maintaining a high concentration of monomers, i. e. by employing low conversion and consequently a high concentration (between 40 and 60% on a diluent-free or 100% monomer basis) in the first stage, a material increase in the viscosity of the product can be obtained. The product obtained in runs C and D has materially improved drying rates over those produced in runs A and B, thus definitely establishing the advantages to be gained by operating in accordance with the present invention.

The nature of the present invention having been thus fully set forth and specific examples of the same given, what is claimed as new and useful and desired to be secured by Letters Patent is:

1. A process for producing a liquid polymer oil which comprises charging a mixture of 50 to 100 parts of butadiene, 50 to 0 parts of styrene, about 1 to 100 parts of an ether having 4 to 8 carbon atoms per molecule chosen from the group consisting of alkyl ethers and cyclic diethers having the oxygen atoms separated by at least two carbon atoms and about 1.0 to 2 parts of finely divided alkali metal catalyst to a first polymerization zone, maintaining an equilibrium monomer concentration of between 40% and 60% on a 100% monomer feed basis, in said first zone, heating the mixture at a temperature between 50 and 70° C. until 40 to 60% conversion of monomers is reached, continuously passing the polymerized mixture to at least one additional polymerization zone at a temperature between 70 and 105° C., adding between 50 and 500 parts based on the total reaction mixture of an inert hydrocarbon diluent boiling between 20 and 250° C. to at least one of said additional zones and continuing the polymerization until 100% conversion is obtained.

2. Process according to claim 1 in which the feed comprises 80 parts of butadiene, 20 parts of styrene, 1 to 100 parts of dioxane, 1.0 to 2 parts of sodium, and 10 to 30% (based on sodium) of isopropyl alcohol.

3. Process according to claim 2 in which the residence time in the first stage is between 0.5 and 2 hours.

4. A process for producing a liquid polymer oil which comprises charging a mixture of 50 to 100 parts of butadiene, 50 to 0 parts of styrene, about 1 to 100 parts of an ether having 4 to 8 carbon atoms per molecule chosen from the group consisting of alkyl ethers and cyclic diethers having the oxygen atoms separated by at least two carbon atoms and about 1.0 to 2 parts of finely divided alkali metal catalyst to a first polymerization zone, maintaining an equilibrium monomer concentration of between 40% and 60% on a 100% monomer feed basis in said first zone, heating the mixture at a temperature between 50° and 70° C. until 40 to 60% conversion of monomers is reached, continuously passing the polymerized mixture to at least one additional polymerization zone at a temperature between 70° and 105° C. and continuing the polymerization until 100% conversion is obtained.

References Cited in the file of this patent

UNITED STATES PATENTS

| | | |
|---|---|---|
| 2,623,032 | Banes et al. | Dec. 23, 1952 |
| 2,669,526 | Koenecke et al. | Feb. 16, 1954 |
| 2,672,425 | Gleason et al. | Mar. 16, 1954 |
| 2,728,801 | Jaros et al. | Dec. 27, 1955 |